(12) United States Patent
Mordukhovich

(10) Patent No.: US 7,040,471 B2
(45) Date of Patent: May 9, 2006

(54) SANDWICH COMPOSITE CLUTCH FRICTION MEMBER WITH DUAL-DIRECTIONAL MODULI OF ELASTICITY

(75) Inventor: Gregory Mordukhovich, Bloomfield Hills, MI (US)

(73) Assignee: General Motors Corporation, Detroit, MI (US)

( * ) Notice: Subject to any disclaimer, the term of this patent is extended or adjusted under 35 U.S.C. 154(b) by 65 days.

(21) Appl. No.: 10/833,911

(22) Filed: Apr. 28, 2004

(65) Prior Publication Data

US 2005/0241908 A1    Nov. 3, 2005

(51) Int. Cl.
*F16D 13/72* (2006.01)

(52) U.S. Cl. .............. 192/70.12; 192/70.14; 192/107 M; 192/113.36

(58) Field of Classification Search ............ None
See application file for complete search history.

(56) References Cited

U.S. PATENT DOCUMENTS

| | | | | |
|---|---|---|---|---|
| 4,291,794 A | * | 9/1981 | Bauer | 192/107 M |
| 4,318,955 A | * | 3/1982 | Kulakov et al. | 442/242 |
| 4,747,476 A | * | 5/1988 | East et al. | 192/107 M |
| 5,096,661 A | | 3/1992 | Lang | 419/2 |
| 5,615,758 A | | 4/1997 | Nels | 192/113.36 |
| 5,662,993 A | | 9/1997 | Winckler | 442/101 |
| 5,676,577 A | * | 10/1997 | Lam et al. | 442/60 |
| 5,842,551 A | | 12/1998 | Nels | 192/107 |
| 5,858,511 A | * | 1/1999 | Lisowsky | 428/167 |
| 6,132,877 A | | 10/2000 | Winckler et al. | 428/408 |
| 6,142,263 A | * | 11/2000 | Lotfipour | 188/73.37 |
| 6,524,681 B1 | * | 2/2003 | Seitz et al. | 428/143 |
| 2003/0012940 A1 | | 1/2003 | Bowles et al. | 428/297.4 |

FOREIGN PATENT DOCUMENTS

GB        2260173 A  *  4/1993

* cited by examiner

*Primary Examiner*—Richard M. Lorence
(74) *Attorney, Agent, or Firm*—Christopher DeVries

(57) ABSTRACT

A friction member for engagement in a torque-transmitting mechanism includes an outer layer comprising a first material. The outer layer has a friction surface for sliding contact with an opposing reaction member in the torque-transmitting mechanism. An inner layer is connected to the outer layer opposite the friction surface and comprises a second material. The inner layer is characterized by a first modulus of elasticity and the outer layer is characterized by a second modulus of elasticity greater than the first modulus of elasticity.

16 Claims, 2 Drawing Sheets

SANDWICH COMPOSITE CLUTCH FRICTION MEMBER WITH DUAL-DIRECTIONAL MODULI OF ELASTICITY

TECHNICAL FIELD

This invention relates to a friction clutch member for use in a wet clutch application.

BACKGROUND OF THE INVENTION

A vehicle engine is traditionally coupled with a transmission for transmitting torque to the wheels via a torque converter. A wet friction interface may be used with the torque converter for establishing torque transfer under a slip condition (i.e., relative rotation of opposing surfaces forming the friction interface). U.S. Pat. No. 6,132,877, issued Oct. 17, 2000 to Winckler et al, assigned to General Motors Corporation, and hereby incorporated by reference in its entirety, describes a friction interface composed of a high density, low porosity, carbon composite material, infiltrated with chemical vapor deposited carbon and, preferably, having a substrate of a satin weave fabric. Another application of a friction interface used in a torque converter is described in U.S. Pat. No. 5,195,621, issued Mar. 23, 1993 to Dull et al, assigned to General Motors Corporation, and hereby incorporated by reference in its entirety. The use of friction material having a heat resistant paper support bearing resin-bonded carbon particles is known in the art, as described in U.S. Pat. No. 5,083,650, issued Jan. 28, 1992 to Seiz et al, assigned to Minnesota Mining and Manufacturing Company and to General Motors Corporation, which is hereby incorporated by reference in its entirety.

Additionally, a wet clutch with a friction interface may be used in lieu of a torque converter for vehicle launch with slip, especially on vehicles designed with a wider overall speed ratio, as the ratio-boosting affect of the torque converter may not be necessary in such an application.

SUMMARY OF THE INVENTION

A friction member that provides a high coefficient of friction at high slip speeds while minimizing vibrational shudder during vehicle launch is desired. Additionally, control of operational viscosity and shearability of the transmission fluid is desirable, as the coefficient of friction is affected by these properties.

A friction member for engagement in a torque-transmitting mechanism (i.e., a clutch) includes an outer layer comprising a first material and having a friction surface for sliding contact with an opposing reaction member in the torque-transmitting mechanism. As used herein, and as will be readily understood by those of ordinary skill in the art, "sliding contact" means that there is relative sliding movement (i.e., slip) between the friction member and the reaction member; preferably, during "sliding contact", the friction surface and reaction member are generally separated from direct physical contact with one another by a layer of lubricant disposed therebetween. The friction member also includes an inner layer operatively connected to the outer layer opposite the friction surface. The inner layer is comprised of a second material. The inner layer is characterized by a first modulus of elasticity and the outer layer is characterized by a second modulus of elasticity. The second modulus of elasticity is greater than the first modulus of elasticity. A friction member having dual-directional moduli of elasticity is discussed in U.S. Provisional Application No. 60/509,589, filed Oct. 8, 2003, which is hereby incorporated by reference in its entirety.

In one aspect of the invention, the sliding contact is characterized by a coefficient of friction. The first modulus of elasticity is in a first direction with respect to the sliding contact. The second modulus of elasticity is in a second direction with respect to the sliding contact. Preferably, the first direction is substantially normal to the sliding contact and the second direction is substantially parallel to the sliding contact. The first and second moduli of elasticity cooperate to at least partially establish the coefficient of friction (i.e., maximize) and control vibrational shudder (i.e., minimize) of the torque-transmitting mechanism resulting from the sliding contact.

In another aspect of the invention, the outer layer includes carbon-based fibers. The carbon-based fibers may be pressed to form the outer layer. Alternatively, the carbon-based fibers may be woven to form the outer layer.

In another aspect of the invention, the inner layer includes cellulose. The inner layer may also include chopped poly-paraphenylene terephthalamide fibers (i.e., fibers of material marketed by DuPont under the trademark KEVLAR®) disposed throughout the cellulose. Alternatively, the inner layer may include poly-paraphenylene terephthalamide fibers. In this instance, the inner layer may be solely poly-paraphenylene terephthalamide fibers rather than a poly-paraphenylene terephthalamide fiber and cellulose mixture.

In yet another aspect of the invention, the inner and outer layers are formed with first and second channels operable for transporting lubricant through the friction member in substantially the first and second directions, respectively. The friction member is characterized by an inner diameter and an outer diameter. The channels are operable for transporting lubricant from one of the inner diameter and the outer diameter.

In another aspect of the invention, the inner and outer layers are each formed with channels disposed in the first direction for transporting lubricant through the friction member in the first direction. The first modulus of elasticity is at least partially affected by lubricant transport through the channels. The transporting of lubricant through the channels at least partially increases the coefficient of friction.

In another aspect of the invention, the inner and outer layers are each formed with channels disposed in a second direction for transporting lubricant through the friction member in the second direction. The second modulus of elasticity is at least partially affected by lubricant transport through the channels. The transporting of lubricant through the channels at least partially decreases vibrational shudder of the torque-transmitting mechanism.

In yet another aspect of the invention, the friction members includes a sublayer operatively connected to the inner layer opposite the outer layer. The sublayer includes the third material. The sublayer is characterized by a third modulus of elasticity that is less than the second modulus of elasticity. The sublayer may be formed with first and/or second channels disposed in the first and second directions, respectively, for transporting lubricant through the friction member in the first and second directions, respectively. The third modulus of elasticity is at least partially affected by lubricant transport through the first and/or second channels.

A power transmission includes a torque-transmitting mechanism. The torque-transmitting mechanism includes a friction member and an opposing reaction member. The friction member and reaction member are selectively engageable for transmitting power. The friction member has a friction surface for sliding contact with the reaction member. The sliding contact is characterized by coefficient of friction and acts to engage the torque-transmitting mechanism. The friction member may include an outer layer and inner layer characterized by a first modulus of elasticity and a second modulus of elasticity, respectively, as described above. The friction member used in the power transmission may have the first and second moduli of elasticity which cooperate as described above with respect to the friction member described above. The friction member used in the power transmission may also have the channel configurations for transporting lubricant as described above.

The above features and advantages, and other features and advantages, of the present invention are readily apparent from the following detailed description of the best mode for carrying out the invention when taken in connection with the accompanying drawings.

DESCRIPTION OF THE PREFERRED EMBODIMENTS

Figure 1:
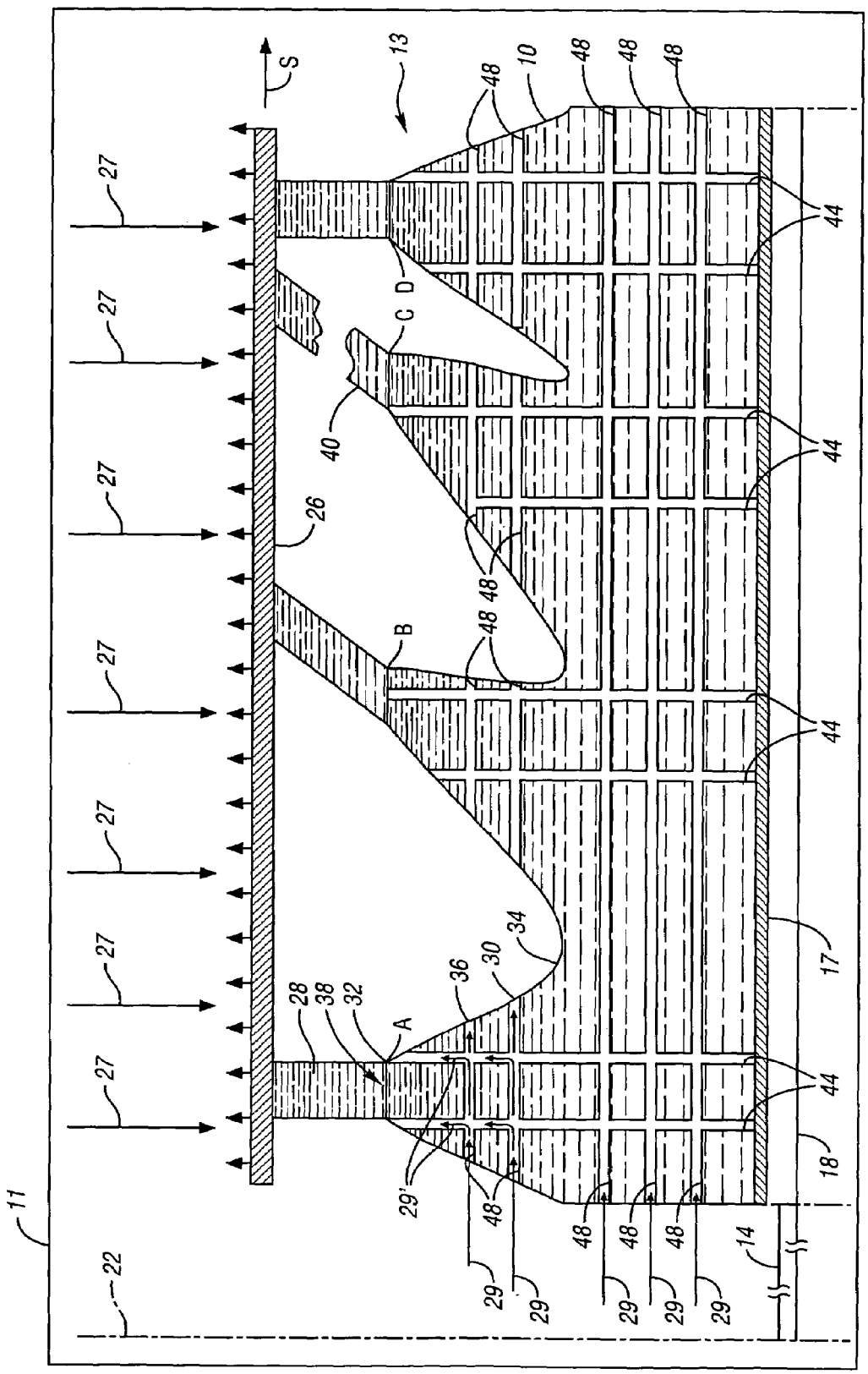
FIG. 1 is a schematic cross-sectional view of a friction member in sliding contact with a reaction member, in accordance with the invention.

Referring to FIG. 1, a schematic radial cross section of a friction member 10 for a transmission 11 is depicted. Preferably, the friction member 10 is an annular ring with an inner radius 14 and an outer radius 18 measured from a center axis of rotation 22. (A corresponding inner diameter and outer diameter are associated with the inner radius 14, and outer radius 18, respectively.) The material from which the friction member is formed has a modulus of elasticity E. The friction member 10 is connected to a clutch plate 17 using adhesives or other attachment mechanisms. The friction member 10 opposes a reaction member or reaction plate 26. The friction member 10 and reaction plate 26 are included in torque-transmitting mechanism 13, which may be a clutch within a torque converter included in the transmission 11. Alternatively, the torque-transmitting mechanism 13 may be a friction interface of a rotating clutch or stationary clutch (i.e., a brake). Preferably, the reaction plate 26 is also an annular ring with a like inner and outer radius. Transmission fluid, also referred to as lubricant or oil, is disposed in the transmission. Some of the fluid forms a column of oil 28 disposed between the reaction plate 26 and the friction member 10, as depicted in FIG. 1, such that engagement of the friction member 10 and the reaction plate 26 is a "wet clutch" application.

At a microscopic level, the friction member 10 is porous with an uneven, irregular surface 30. The elevational difference between a selected peak (high portion) 32 and valley (low portion) 34 forms a peaked portion 36. (The friction member 10 has a multitude of peaked portions of various heights, only one of which is schematically depicted in FIG. 1 at various stages of flex during sliding of the reaction plate 26 relative to the friction member 10.) When applied pressure (denoted by arrows 27) forces the reaction plate 26 and the friction member 10 toward one another, the actual contact area 38 between the plate 26 and the friction member 10 is at the top of the peaked portion 36.

During the elasto-hydrodynamic (EHD) phase of clutch engagement, the column of oil 28 is disposed between the plate 26 and the friction member 10. During engagement, it may be desirable to have a period of slip (i.e., a velocity differential, also referred to as slip speed) between the friction member 10 and the reaction plate 26 to allow for a gradual torque transmission. The coefficient of friction u (i.e., the ratio of resulting tangential force between the friction member 10 and the reaction plate 26 to the applied normal force) may vary with slip speed, as it may be more difficult for the friction member 10 to "grab" to the reaction plate 26 at high slip speeds. It is desirable to maximize the coefficient of friction u at high slip speeds for efficient torque transfer. Generally, a friction member having a low modulus of elasticity in the direction normal to the actual contact area 38 (herein referred to as a first modulus of elasticity $E_1$) will increase the actual contact area 38, thus providing a greater coefficient of friction u than a friction member with a high modulus of elasticity in the normal direction.

The coefficient of friction u is also a function of the oil viscosity and shearability at the actual contact area 38. During frictional engagement, the viscous property of the column of oil 28 in contact with the peaked portion 36 causes the peaked portion 36 to bend or flex in the direction of slide (i.e., slip) between the friction member 10 and the plate 26. The bend or flex of the peaked portion 36 is proportional to its stiffness in the direction of slide (i.e., its modulus of elasticity in the radial direction, also referred to herein as the second modulus of elasticity, $E_2$). The direction of slip or slide is denoted in FIG. 1 by the arrow labeled S. As is schematically depicted in FIG. 1, during slide (i.e., slip), a given peaked portion 36 will bend from an original position A to an intermediate bent position B. At a later time, shear forces will cause the column of oil 28 at the contact area 38 to shear (depicted by sheared oil contact 40); at the shear point, the peaked portion 36, momentarily no longer subject to the viscous force of the column of oil 28, will spring back from a final bent position C to the position D, which is substantially the same as original position A. This spring-back of peaked portions during shear may contribute to vibrational shudder of the transmission. Accordingly, it is desirable to minimize the deformability of the friction member 10 in the direction of slip, thus minimizing shudder. This may be accomplished by providing a relatively high second modulus of elasticity $E_2$ in the direction of slip. The fluid pressure in the friction member 10 may also influence shudder; for instance, a highly pressurized fluid acting on the friction member 10 may increase the modulus of elasticity $E_2$.

Vibrational shudder may be minimized by increasing the modulus of elasticity $E_2$ and/or decreasing the modulus of elasticity $E_1$. Shudder caused by "self excitation" of the friction member 10 may occur if the reaction plate 26 is not flat. During use, a reaction plate that is not flat may have different localized temperatures across it (due to an irregular contact area) causing variations in the height of a typical column of oil 28 between the reaction plate 26 and the friction member 10, thus creating variations in cooling. As discussed below, temperature variations may lead to shudder. Decreasing the modulus of elasticity $E_1$ increases the damping capability of the friction member 10, allowing it to conform to the surface area of the reaction plate 26 (which is typically not perfectly flat), thus minimizing temperature variations.

Vibrational shudder may also occur if the reaction plate 26 and friction member 10 are not parallel upon engagement. Such misalignment will cause a portion of the friction member 10 to contact the reaction plate 26 prior to the remainder of the friction member 10, resulting in pressure variations across the friction member 10. As discussed below, pressure variations cause temperature and oil viscosity variations, which may lead to shudder.

The coefficient of friction, the operational oil viscosity and the shearability of the oil at the contact area are functions of pressure and temperature at the contact area, as well as the pressure differential between the high portion 32 (i.e., the portion of the friction member 10 in contact with the reaction plate 26) and the low portion 34 (i.e., the portion of the friction member 10 out of contact with the reaction plate 26). Temperature is lower at higher pressures. In fact, the actual contact temperature may be up to 300 degrees Celsius, at which temperature the operational viscosity is very sensitive to pressure fluctuations. Accordingly, it follows that operational oil viscosity (which increases with increased pressure) must be kept high at high temperatures in order to minimize or avoid asperity contact. It should be noted that higher slip speeds lead to increased system temperatures. Additionally, the temperature at the contact area may be controlled (i.e., minimized) by one or more of (i) keeping the applied piston pressure low; (ii) increasing the actual contact area; and (iii) controlling the low of oil past the contact area (permitting cooling thereof) by increasing he clutch oil pressure. With respect to the second alternative above, the actual contact area may be increased by modifying the surface design of the friction member 10. Minimizing temperature at the contact area also leads to a longer useful life of the lubricant, as the rate of depletion of friction modifier additives that may be in the lubricant is decreased at lower temperatures. Additionally, the pressure and temperature at the contact area and the pressure differential are affected by and, therefore, can be controlled by controlling the modulus of elasticity in the normal direction (i.e., the first modulus of elasticity, $E_1$) and the fluid pressure in the porous friction member 10.

The fluid pressure in the friction member 10 is a function of the radial porosity of the member 10, pressure applied to the fluid from a pressure source such as a pump (not shown) and centrifugal forces acting to move fluid radially outward. With increasing clutch pressure, the coefficient of friction is increased at a given slip speed. Additionally, with fluid flow, the fluctuation or spike in the coefficient of friction u (felt as vibrational shudder) as the sliding speed approaches 0.00 m/s (i.e., near completion of clutching, after the slip launch phase) is lessened with respect to that which occurs when there is no fluid flow. The friction coefficient u typically experiences such a spike, causing shudder, near clutch completion. The coefficient of friction often decreases at higher slip speeds.

The friction member 10 is formed with first channels 44 disposed axially, in a first direction substantially normal to the sliding contact between the friction member 10 and the reaction plate 26. The first channels 44 are able to transport fluid to and from the contact area 38. Thus, the first channels 44 affect the temperature and pressure at the contact area as well as the pressure differential between the high portion 32 and low portion 34. The first channels 44 also affect the modulus of elasticity $E_1$ in the first direction. Preferably, the modulus of elasticity $E_1$ is significantly less than the modulus of elasticity E of the friction member 10 formed without the channels 44. Accordingly, the design of the first channels 44 may at least partially establish (e.g., increase) the friction coefficient u of the friction member 10 during engagement.

The friction member 10 is formed with second channels 48 disposed radially, in a second direction substantially parallel to the sliding contact area 38 between the friction member 10 and the reaction plate 26. The second channels 48 increase the porosity of the frictional member 10 in the sliding direction. Preferably, the second channels 48 remain at least partially open, permitting oil flow therethrough, even under loading by normal forces between the friction member 10 and the reaction plate 26. The channels 44 and 48 of FIG. 1 are shown schematically as straight parallel and perpendicular lines for illustrative purposes; however, the channels 44, 48 are likely to be irregular in practice, having sufficient porosity to allow flow in the parallel and perpendicular directions.

Movement of fluid through the member 10 helps to cool the contact area 38 and control the pressure and pressure differentials near the contact area 38 (thereby increasing the coefficient of friction). While radial and normal porosity may contribute to such movement, they may also pressurize and thereby stiffen the friction member 10, increasing the modulus of elasticity in both the first direction (i.e., $E_1$, which may not be desirable, as discussed above) and the second direction (i.e., $E_2$, which is desirable, as discussed above). Additionally, centrifugal forces act upon the fluid, moving it radially outward. Thus, an oil supply to the second channels 48 from the inner radius 18 of the friction member 10 (as shown by arrows 29 denoting fluid transport into the channels 48) will work with the centrifugal force whereas an oil supply from the outer radius 18 of the friction member 10 will work against centrifugal force, requiring a greater oil clutch pressure to move the fluid radially inward through the friction member 10. (Arrows 29' denote fluid transport from the channels 48 to the channels 44. Fluid transport is only shown in selected channels 44, 48, or portions thereof. Like fluid transport occurs throughout the channels 44, 48.)

Accordingly, an oil supply from the outer radius 18 to the channels 48 requires a greater fluid pressure than an oil supply from the inner radius 14 to the channels 48. A relatively greater fluid pressure leads to better shudder resistance (i.e., greater $E_2$ as described above) while a relatively lower fluid pressure leads to greater damping properties in the normal direction (i.e., lower $E_1$). The size and number of channels 44, 48 also affects the required fluid pressure to affect fluid flow through the channels, as will be readily understood to those skilled in the art. Thus, the selected size and number of the channels 44, 48, as well as the choice of supplying fluid from the inner vs. the outer radius 14, 18, respectively, allows for an optimized, dual-directional moduli of elasticity in the friction member 10.

It is desirable to establish a relatively high modulus of elasticity $E_2$ in the second direction (i.e., the radial direction) to minimize shudder, as discussed above. (Preferably, the modulus of elasticity $E_2$ is greater than the modulus of elasticity E of the friction member 10 formed without the channels 48.) However, it is desirable to keep the stiffness, or modulus of elasticity $E_1$ in the normal direction low, as discussed above, to maximize the coefficient of friction u. Accordingly, the first and second channels 44, 48 must be designed in appropriate size and number to accomplish the goals of low $E_1$, high $E_2$ (i.e., dual-directional moduli of elasticity) and adequate porosity to provide cooling circulation of the oil at the actual contact area 38. Preferably, channels 44 and 48, although likely deformed, remain open even under clutch pressure, such that the cooling function is accomplished.

Figure 2A:
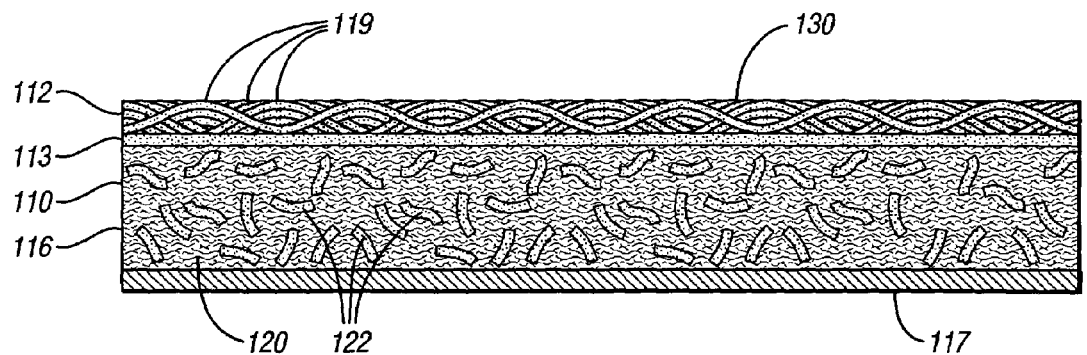
FIG. 2A is a schematic elevational view of a first embodiment of the friction member of FIG. 1.

Referring to FIG. 2A, a friction member 110 having a "sandwiched composite" construction is illustrated. The friction member 110 includes an outer layer 112 connected to an inner layer 116. The outer and inner layers 112, 116, respectively, may be connected by a resin 113 or by any other connection methods known to those skilled in the art. The inner layer 116 is connected to a clutch plate 117 by a resin, an adhesive or any other connection mechanism known to those skilled in the art.

The outer layer 112 is a first material, preferably woven carbon fibers 119. The carbon fibers 119 are preferably made using a chemical vapor deposition process in which carbon is deposited upon cotton fibers and processed to result in a carbon fiber (the cotton infrastructure being burned away during processing) as will be readily understood to those skilled in the art. A variety of weave patterns may be used in constructing the outer layer 112. Preferably, a weave of sufficient tightness to result in a substantially flat friction surface 130 is used. However, preferably the weave also permits first and second channels for transport of lubricant through the outer layer 112 (the channels being as illustrated in FIGS. 1 and 2B).

The inner layer 116 is composed of a second material that is different from the first material used to compose the outer layer 112. Preferably, the inner layer 116 is formed from cellulose 120 having chopped poly-paraphenylene terephthalamide fibers 122 disposed throughout the cellulose 120. Poly-paraphenylene terephthalamide fibers, marketed under the trademark KEVLAR® by DuPont, are compliant, having a lower modulus of elasticity than the cellulose 120. Poly-paraphenylene terephthalamide fibers are flexible, light-weight and high strength, with a relatively low modulus of elasticity and provide good damping properties. The modulus of elasticity of the inner layer 116 (which may be referred to as a first modulus of elasticity $E_1'$) is a function of the combined moduli of elasticity of the cellulose 120 and poly-paraphenylene terephthalamide fibers 122 components of the inner layer 116. Accordingly, the volume ratio of cellulose 120 to poly-paraphenylene terephthalamide fibers 122 in the inner layer 116 will affect the resulting first modulus of elasticity $E_1'$ of the inner layer 116. The chosen ratio of cellulose 120 to poly-paraphenylene terephthalamide fibers 122 will be a function of the particular friction application required of friction member 110. Alternatively, the inner layer 116 may be comprised of only cellulose 120 or only poly-paraphenylene terephthalamide fibers 122.

The outer layer 112 is characterized by a second modulus of elasticity $E_2'$. The carbon fibers 119 disposed in the weave pattern will typically have a modulus of elasticity that is greater than the combined modulus of elasticity resulting from the cellulose 120 and poly-paraphenylene terephthalamide fibers 122 composed inner layer 116 (and greater than the modulus of elasticity of cellulose or poly-paraphenylene terephthalamide alone, if the inner layer 116 is so constructed).

Figure 2B:
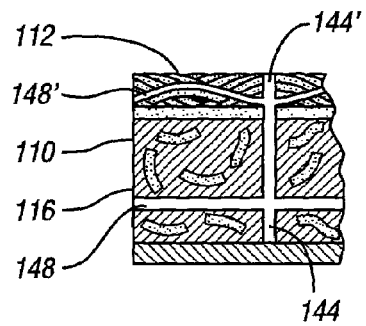
FIG. 2B is a fragmentary cross-sectional view of the friction member of FIG. 2A.

Referring to FIG. 2B, the inner layer 116 is porous, as the cellulose 120 is known to be a porous material. Accordingly, first channels 144 are disposed in a first direction (which is substantially normal to the direction of slide (as shown in respect to friction number 10 in FIG. 2A)). Additionally, second channels 148 are formed within the inner layer 116. The second channels 148 are substantially parallel to the direction of slide shown in FIG. 2A. The friction member 110 preferably has an annular ring-shape, as described with respect to friction member 10 of FIG. 2A, having an inner radius and an outer radius. Accordingly, the friction member 110 may be used with reaction plate such as reaction plate 26 of FIG. 1 and will exhibit similar elasto-hydrodynamic slide and elasticity properties. The outer layer 112 has similar first channels 144' and second channels 148'. The outer layer 112, being preferably made of woven carbon fibers, is purposely constructed to exhibit a greater modulus of elasticity (second modulus of elasticity) than the inner layer 116 but nevertheless still be of a construction such as to allow lubricant transport through channels 144' and 148'. For the purpose of understanding such lubricant transport, the outer layer 112 may be viewed as a reticulated, screen-like formation. The reticulations would thus form sufficient open spaces in one direction to form normal channels 144' cross-wise through the reticulated formation, as well as sufficient open spaces meandering substantially along the plane of the reticulated formation to form channels 148' substantially parallel to the direction of slide.

Accordingly, if the friction member 110 of FIGS. 2A and 2B is used in a torque-transmitting mechanism such as torque-transmitting mechanism 13 of FIG. 1, the higher second modulus of elasticity $E_2'$ of the outer layer 112 will provide a substantially flat friction surface 130 and contribute to a reduction in vibrational shudder of the torque-transmitting mechanism and the transmission in which it may be used. Additionally, the inner layer 116 having a first modulus of elasticity $E_1'$ that is lower than the second modulus of elasticity $E_2'$ will contribute to a compliant friction member 110 exhibiting a high coefficient of friction. The sandwiched nature of the friction member 110 permits both objectives of a high modulus of elasticity in the direction of slide ($E_2'$) and a low modulus of elasticity in the direction of applied pressure ($E_1'$) while permitting lubricant transport through the friction member 110 as described above.

Figure 3:
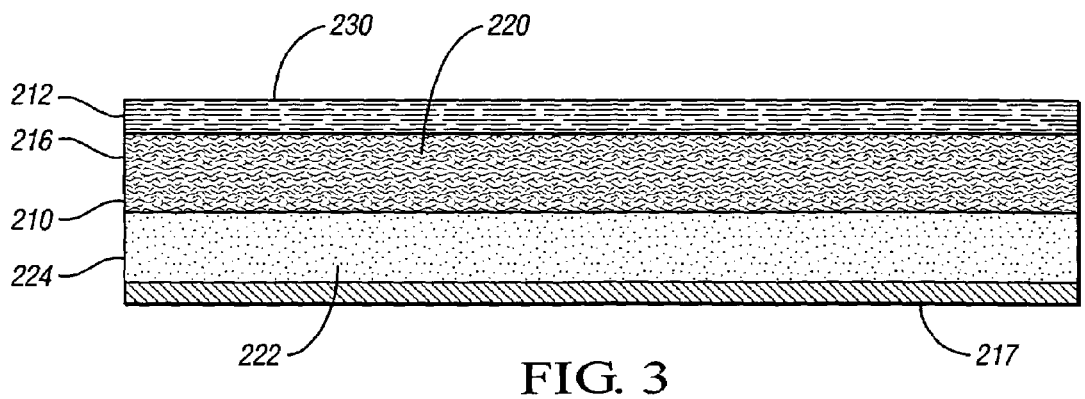
FIG. 3 is a schematic elevational view of a second embodiment of the friction member of FIG. 1.

Referring to FIG. 3, a friction member 210 having multiple layers is illustrated. An outer layer 212 forms a friction surface 230. An inner layer 216 is connected to the outer layer 212. Preferably, the outer layer 212 is composed of pressed carbon. The pressed carbon is attached to the inner layer 216 by the pressing process, thus alleviating the need for a resin or other adhesive to connect the outer and inner layers 212, 216. The inner layer 216 is preferably cellulose 220. A sublayer 224 is connected to the inner layer 216 opposite the outer layer 212. The sublayer is also connected to a clutch plate 217 by an adhesive, a resin or other means. Preferably, the sublayer 224 is poly-paraphenylene terephthalamide fibers.

The cellulose 220 inner layer 216 is characterized by a first modulus of elasticity $E_1''$. The pressed carbon fiber outer layer 212 is characterized by a second modulus of elasticity $E_2''$ that is greater than the first modulus of elasticity $E_1''$ of the inner layer 216. The sublayer 224, made of poly-paraphenylene terephthalamide fibers 222, is characterized by a third modulus of elasticity $E_3$ that is lower than the second modulus of elasticity $E_2''$ and also typically lower than the first modulus of elasticity $E_1''$. Like the friction member 10 of FIG. 1 and the friction member 110 of FIGS. 2A and 2B, the friction member 210 is porous such that first and second channels (not shown, but constructed similarly to channels 44, 48 of FIG. 1 and channels 144', 148' of FIG. 2B) are formed within the outer layer 212, the inner layer 216, and the sublayer 224. Accordingly, lubricant may be transported through the friction member 210 as illustrated in FIG. 1 and FIG. 2B. The transporting of lubricant and the material selection resulting in the first, second and third moduli of elasticity cooperate such that the friction member 210 exhibits a high coefficient of friction in during sliding contact at the friction surface 230 and results in little vibrational shudder due to the relatively low first and third moduli of elasticity of the inner layer 216 and sublayer 224, respectively.

As set forth in the claims, various features shown and described with the different embodiments of the invention may be combined.

While the best modes for carrying out the invention have been described in detail, those familiar with the art to which this invention relates will recognize various alternative designs and embodiments for practicing the invention within the scope of the appended claims.

The invention claimed is:

1. A friction member for engagement in a torque-transmitting mechanism, the friction member comprising:
   an outer layer comprising a first material of pressed carbon having a friction surface for sliding contact with an opposing reaction member in the torque-transmitting mechanism;
   an inner layer operatively connected to said outer layer opposite said friction surface and comprising a second material;
   wherein said inner layer is characterized by a first modulus of elasticity and said outer layer is characterized by a second modulus of elasticity greater than said first modulus of elasticity.

2. The friction member of claim 1, wherein said sliding contact is characterized by a coefficient of friction;
   wherein said first modulus of elasticity is in a first direction with respect to said sliding contact, wherein said second modulus of elasticity is in a second direction with respect to said of sliding contact; and
   wherein said first and second moduli of elasticity cooperate to at least partially establish said coefficient of friction and control vibrational shudder of the torque-transmitting mechanism resulting from said sliding contact.

3. The friction member of claim 2, wherein said inner and outer layers are formed with first and second channels operable for transporting lubricant through the friction member in substantially said first and second directions, respectively;
   wherein the friction member is characterized by an inner diameter and an outer diameter; and
   wherein said first and second channels are operable for transporting lubricant from one of said inner diameter and said outer diameter.

4. The friction member of claim 2, wherein said inner and outer layers are each formed with channels disposed in said first direction for transporting lubricant through said friction member in said first direction, said first modulus of elasticity being at least partially affected by lubricant transport through said channels to thereby at least partially increase said coefficient of friction.

5. The friction member of claim 2, wherein said inner and outer layers are each formed with channels disposed in said second direction for transporting lubricant through said friction member in said second direction, said second modulus of elasticity being at least partially affected by lubricant transport through said channels to thereby at least partially decrease vibrational shudder of the torque-transmitting mechanism.

6. The friction member of claim 2, wherein said first direction is substantially normal to said sliding contact; and wherein said second direction is substantially parallel to said sliding contact.

7. The friction member of claim 1, wherein said inner layer includes cellulose.

8. The friction member of claim 7, wherein said inner layer further includes chopped poly-paraphenylene terephthalamide fibers disposed through said cellulose.

9. The friction member of claim 1, wherein said inner layer includes poly-paraphenylene terephthalamide fibers.

10. The friction member of claim 1, further comprising:
    a sublayer operatively connected to said inner layer opposite said outer layer and including a third material; and
    wherein said sublayer is characterized by a third modulus of elasticity that is less than said second modulus of elasticity.

11. The friction member of claim 10, wherein said sublayer is formed with at least one of first channels disposed in said first direction and second channels disposed in said second direction for transporting lubricant through said friction member in said first and second directions, respectively, said third modulus of elasticity being at least partially affected by lubricant transport through said at least one of first channels and second channels.

12. A power transmission comprising:
    a torque-transmitting mechanism including:
    a friction member;
    an opposing reaction member, said friction member and reaction member being selectively engageable for transmitting power;
    said friction member having a friction surface for sliding contact with said reaction member, wherein said sliding contact is characterized by a coefficient of friction, said sliding contact acting to engage said torque-transmitting mechanism;
    said friction member having:
       an outer layer comprising a first material that forms said a friction surface for sliding contact with said reaction member;
       an inner layer operatively connected to said outer layer opposite said friction surface and comprising a second material; wherein said first material is carbon pressed to said inner layer for sufficient securement thereto such that said friction member is characterized by an absence of adhesive between said inner layer and said outer layer;
       wherein said inner layer is characterized by a first modulus of elasticity and said outer layer is characterized by a second modulus of elasticity greater than said first modulus of elasticity.

13. The power transmission of claim 12, wherein said sliding contact is characterized by a coefficient of friction;
    wherein said first modulus of elasticity is in a first direction with respect to said sliding contact, wherein said second modulus of elasticity is in a second direction with respect to said direction of sliding contact; and
    wherein said first and second moduli of elasticity cooperate to at least partially establish said coefficient of friction and control vibrational shudder of the torque-transmitting mechanism resulting from said sliding contact.

14. The power transmission of claim 13, wherein said first direction is substantially normal to said sliding contact; and wherein said second direction is substantially parallel to said sliding contact.

15. The power transmission of claim 12, wherein said inner and outer layers are formed with channels operable for transporting fluid through said friction member in substantially said first and second directions;

wherein said friction member is characterized by an inner diameter and an outer diameter; and wherein said channels are operable for transporting lubricant from one of said inner diameter and said outer diameter.

16. A friction member for engagement in a torque-transmitting mechanism, said friction member comprising:

an outer layer comprising a first material that forms a friction surface for sliding contact with an opposing reaction member in the torque-transmitting mechanism;

an inner layer operatively connected to said outer layer opposite said friction surface and comprising a second material; wherein said first material is carbon pressed to said inner layer for sufficient securement thereto such that said friction member is characterized by absence of adhesive between said inner layer and said outer layer;

wherein said inner layer is characterized by a first modulus of elasticity and said outer layer is characterized by a second modulus of elasticity greater than said first modulus of elasticity;

wherein said first modulus of elasticity is in a first direction substantially normal to said sliding contact;

wherein said second modulus of elasticity is in a second direction substantially parallel to said sliding contact;

wherein said first and second moduli of elasticity cooperate to at least partially establish said coefficient of friction and control vibrational shudder of the torque-transmitting mechanism resulting from said sliding contact;

wherein the friction member is characterized by an inner diameter and an outer diameter; and wherein said inner and outer layers are formed with channels operable for transporting fluid through said friction member in substantially said first and second directions; and wherein said channels are operable for transporting lubricant from one of said inner diameter and said outer diameter.

* * * * *